(12) United States Patent
Sadiq

(10) Patent No.: US 10,885,506 B2
(45) Date of Patent: *Jan. 5, 2021

(54) SYSTEM AND METHOD FOR ELECTRONICALLY PROVIDING RECEIPTS

(71) Applicant: Mastercard International Incorporated, Purchase, NY (US)

(72) Inventor: Mohammed Sadiq, Dubai (AE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 358 days.

This patent is subject to a terminal disclaimer.

(21) Appl. No.: 15/730,048

(22) Filed: Oct. 11, 2017

(65) Prior Publication Data

US 2018/0032995 A1    Feb. 1, 2018

Related U.S. Application Data

(62) Division of application No. 14/248,666, filed on Apr. 9, 2014, now Pat. No. 9,792,601.

(51) Int. Cl.
  *G06Q 50/00* (2012.01)
  *G06Q 20/32* (2012.01)
  *G06Q 20/20* (2012.01)
  *G06Q 20/04* (2012.01)

(52) U.S. Cl.
  CPC ......... *G06Q 20/322* (2013.01); *G06Q 20/047* (2020.05); *G06Q 20/209* (2013.01)

(58) Field of Classification Search
  None
  See application file for complete search history.

(56) References Cited

U.S. PATENT DOCUMENTS

| | | | | |
|---|---|---|---|---|
| 5,739,512 | A * | 4/1998 | Tognazzini | G06Q 20/0453 235/380 |
| 10,419,529 | B2 * | 9/2019 | Kalgi | G06Q 20/227 |
| 2007/0069013 | A1 * | 3/2007 | Seifert | G06O 20/0453 235/383 |
| 2013/0013499 | A1 * | 1/2013 | Kalgi | G06Q 20/12 705/41 |
| 2013/0151344 | A1 * | 6/2013 | Tavares | G06Q 30/00 705/14.65 |

(Continued)

*Primary Examiner* — Fateh M Obaid
(74) *Attorney, Agent, or Firm* — Leason Ellis LLP

(57) ABSTRACT

Systems and methods are provided for facilitating the automatic transmission of an electronic receipt to a user conducting a financial transaction at a computing device. The systems and methods described herein enable a series of operations whereby a user can conduct a transaction at a computing device and the computing device can automatically read user-account information and one or more electronic contact addresses which are stored in the memory of the user's personal transaction device. The system can also process the transaction and automatically transmit an electronic receipt to the electronic contact address providing an automated transaction experience that does not require the user to actively input an electronic contact address into the computing device in order to have the receipt transmitted electronically. In addition, the system thereby facilitates private transaction as opposed the unsecured and time-consuming process of manually entering a contact address.

20 Claims, 5 Drawing Sheets

(56) References Cited

U.S. PATENT DOCUMENTS

| | | | |
|---|---|---|---|
| 2013/0159081 A1* | 6/2013 | Shastry | G06Q 30/0274 705/14.23 |
| 2015/0019944 A1* | 1/2015 | Kalgi | G06F 16/958 715/205 |
| 2015/0039462 A1* | 2/2015 | Shastry | G06Q 30/0633 705/26.7 |
| 2015/0187021 A1* | 7/2015 | Moring | G06Q 40/12 705/17 |

* cited by examiner

SYSTEM AND METHOD FOR ELECTRONICALLY PROVIDING RECEIPTS

CROSS-REFERENCE TO RELATED APPLICATIONS

The present application is a divisional of U.S. patent application Ser. No. 14/248,666 filed on Apr. 9, 2014, entitled "A SYSTEM AND METHOD FOR ELECTRONICALLY PROVIDING RECEIPTS" the contents of which is hereby incorporated by reference as if set forth expressly in its respective entirety herein.

TECHNICAL FIELD OF THE DISCLOSURE

This patent application relates generally to the field of electronic transactions and, in particular, electronic systems configured to process financial transactions and generate transaction receipts.

BACKGROUND OF THE DISCLOSURE

Financial transactions are often performed by users at computer terminals. For example, bank transactions performed at an automated teller machine (ATM). By way of further example, point-of-sale (POS) devices are often used to conduct financial transactions between a consumer and a merchant for payment of goods or services.

With the widespread use of wireless communications and sophisticated mobile devices such as smart phones, tablet computers and the like, merchants are also using Mobile Point of Sale (MPOS) technology to conduct financial transactions. MPOS technology allows mobile devices to be used as a point-of-sale terminal. This is typically achieved by adding a hardware device (e.g., a dongle/card-reader, contactless transaction device reader, etc.) to accept electronic transaction information, thereby transforming a mobile phone into a POS device.

Many consumers use transaction cards, such as debit cards, credit cards or prepaid cards having magnetic strips or computer chips to complete such financial transactions. Another method for completing these transactions is "contactless" transaction, such as can be done using with PAYPASS® by MasterCard International Incorporated of Purchase N.Y., the assignee of the present disclosure. Using contactless transaction technology, consumers complete a payment transaction by bringing a contactless-enabled transaction card or other contactless-enabled transaction device, such as a key fob, within proximity of a point-of-sale terminal reader, rather than swiping or inserting a card. With the rising popularity of near field communications (NFC) equipped smart phones, consumers are also completing contactless transactions using their smart phones instead of the traditional wireless transaction key fobs.

As would be understood, many financial transactions are memorialized in a receipt for the parties to the transaction. Traditionally, this is in the form of a paper receipt printed at a transaction terminal using a connected printer. In general, MPOS devices do not, by themselves, provide paper receipts. Although paper receipts can be provided by an attached printer, receipts are usually provided electronically to the consumer, for example, by short messaging service (SMS) to the consumer's telephone number or via e-mail. In some implementations, fixed transaction terminals can also be configured to transmit receipts electronically to consumers.

One drawback to transactions in which electronic receipts are transmitted to the consumer is that the consumer is required to enter their electronic contact addresses (e.g., e-mail, telephone number, etc.) into the POS/MPOS terminal. This is a lengthy and cumbersome process requiring active input that ultimately can hinder the user experience and use of these technologies. For example, when faced with a lengthy multi-step process to enter a contact address the consumer may prefer to pay with cash or not receive a receipt. In addition, the entry process is error prone, for example, typographical errors, and therefore the electronic receipts are often not transmitted to the appropriate electronic contact address.

Another barrier to performing transactions using MPOS devices is that the consumer often lacks trust in the electronic devices being used and/or the merchant using the MPOS device. For example, a consumer may be hesitant to share personal contact information using an MPOS device that is often the merchant's personal device because the merchant's device may have no restrictions on application downloads and can be prone to hacking. In addition some customers may not be comfortable providing personal information to merchants for privacy reasons, say, for fear of unwanted contact from the merchant or sharing of personal contact information.

As such, what is desired is a system to automatically capture a consumer's electronic contact address when conducting an electronic transaction at a computing device and automatically transmit an electronic receipt to the captured contact address. Furthermore, it is desirable to capture such information and other preferences in a manner that enhances user privacy.

It is with respect to these and other considerations that the disclosure made herein is presented.

SUMMARY OF THE DISCLOSURE

Technologies are presented herein in support of a system and method for facilitating an automatic transmission of an electronic receipt to a user completing a financial transaction using a computing device.

According to a first aspect, the method for facilitating an automatic transmission of an electronic receipt to a user completing a financial transaction using a computing device includes the steps of receiving by the computing device configured by executing instructions therein transaction information concerning the financial transaction being conducted by the user and a third-party. In furtherance of the transaction, the method also includes reading user-account information that is stored in the memory of a personal transaction device presented by a user. The user account information can be read by the computing device using an associated electronic reader. In addition, the personal transaction device memory can also store one or more electronic contact addresses associated with the user. The method also includes automatically capturing the one or more electronic contact addresses stored in one or more fields of the personal transaction device using the electronic reader. In addition, the computing device also causes one or more of a plurality of remote computing devices to process the financial transaction according to the transaction information and the user-account information.

Furthermore, the computing device also causes one or more of the plurality of remote computing devices to automatically transmit an electronic receipt concerning the processed financial transaction to the one or more electronic contact addresses.

The method can also include capturing contact preferences stored in one or more fields of the personal transaction device using the electronic reader, the contact preferences concerning the automatic transmission of the electronic receipt to the one or more electronic contact addresses.

The method can also include presenting, by the computing device, the one or more electronic contact addresses to the user through an output device, such as a display. In addition, the computing device can also receive from the user, via an input device, user instructions concerning the automatic transmission of the electronic receipt to the one or more electronic contact addresses. Furthermore, the computing device can cause the one or more of the plurality of remote computing devices to automatically transmit the electronic receipt to the one or more electronic contact addresses according to the contact preferences and the user instructions.

According to another aspect, a system is provided for facilitating an automatic transmission of an electronic receipt to a user completing a financial transaction using a computing device. The system includes one or more processors configured to interact with a electronic reader, a network communication interface and a computer-readable storage medium and execute one or more software modules stored on the storage medium. The software modules include a transaction device reader module that configures the one or more processors and the electronic reader of the computing device to receive user-account information and automatically capture one or more electronic contact addresses associated with the user from a personal transaction device presented by the user. The personal transaction device includes a memory having the user-account information and the one or more electronic contact addresses stored in one or more fields of the memory. The software modules also include a transaction processing module that configures the one or more processors to receive transaction information concerning the financial transaction. The software modules also include a communications module that configures the one or more processors and the network communication interface of the computing device, to cause one or more of a plurality of remote computing devices to process the financial transaction according to the transaction information and the user-account information, and to cause one or more of the plurality of remote computing devices to automatically transmit an electronic receipt concerning the processed financial transaction to the one or more electronic contact addresses over a communications network.

These and other aspects, features, and advantages can be appreciated from the accompanying description of certain embodiments of the invention and the accompanying drawing figures and claims.

DETAILED DESCRIPTION OF CERTAIN EMBODIMENTS OF THE DISCLOSURE

Figure 1:
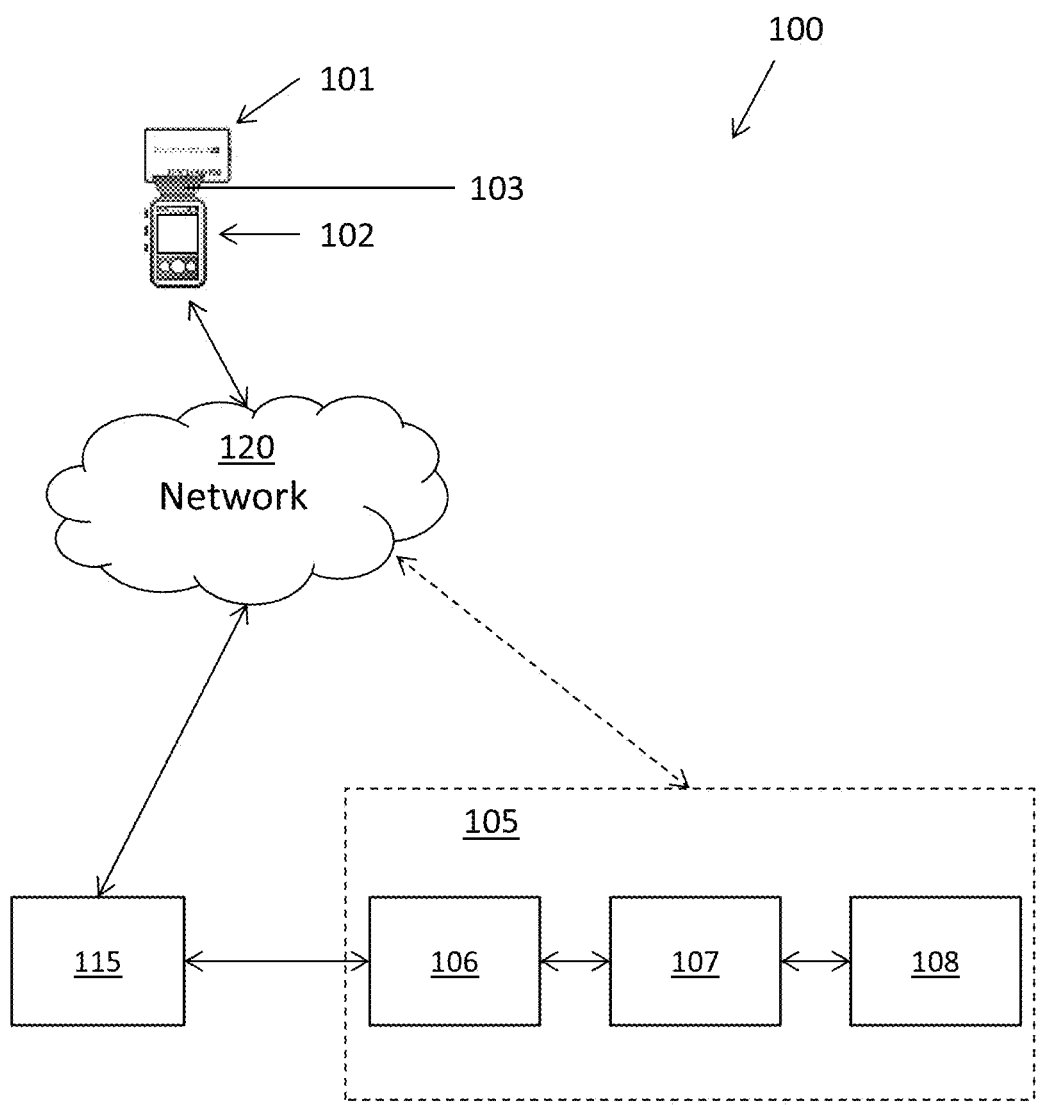
FIG. 1 is a high-level diagram illustrating computer system for facilitating the automatic transmission of an electronic receipt to a user conducting a financial transaction at a computing device in accordance with certain embodiments of the invention.

By way of overview and introduction, various systems and methods are described herein that facilitate the automatic transmission of an electronic receipt to a user conducting a financial transaction at a computing device. The systems and methods described herein enable a series of operations whereby the user can conduct a financial transaction at a computing device, for example, purchase goods from a merchant at a mobile-point-of-sale (MPOS) device or perform a banking transaction at an automated teller machine (ATM). Preferably the user completes the transaction using a personal transaction device, such as, a transaction or payment card, or a contactless transaction enabled device. In furtherance of the financial transaction, the computing device can read user-account information (e.g., bank account information, payment card information, and the like) from the user's personal transaction device and process the financial transaction.

According to a salient aspect of the disclosed embodiments, the computing device can also automatically capture one or more electronic contact addresses (e.g., an e-mail address, cellular telephone number, and the like), which are stored in the memory of the personal transaction device. The computing device is further configured to transmit the user-account information and the e-mail address to one or more remote computing devices causing the remote computing devices to process the transaction and automatically transmit an electronic receipt to the e-mail address. The system thereby provides a uniquely automated transaction experience for the user and does so seamlessly without requiring a user to actively input an electronic contact address into the computing device in order to have the receipt transmitted electronically to the user. In addition, the system thereby provides a more private transaction as opposed the unsecured and time-consuming process of manually entering an email address.

The systems and methods for facilitating the automatic transmission of an electronic receipt to a user conducting a financial transaction at a computing device are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather, are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

FIG. 1 is high-level diagram depicting an exemplary configuration of a system (100) for facilitating the automatic transmission of an electronic receipt to a user who is conducting a financial transaction at a computing device. The system 100 can include a computing device 102 and a personal transaction device 101 (e.g., credit card, bank card, pre-paid card, NFC enabled device, and the like) that is associated with the user and one or more remote computing devices configured to facilitate the processing of financial transactions and transmission of electronic receipts. As further described herein, the computing device 102 can be any computing device and/or data processing apparatus capable of embodying the systems and/or methods described herein, including, but not limited to, a dedicated POS system, ATM terminal, a personal computer, laptop computer, tablet computer or smart phone device and the like. Preferably, the computing device 102 can use an internal or external reader 103 that is configured to read or receive information from one or more of a variety of personal transaction devices 101 presented by the user.

As shown in FIG. 1, the remote computing devices can include a transaction processing system 105 and a transaction service manager device 115. Such computing devices directly/indirectly transmit and/or receive data to/from the computing device 102, thereby preferably initiating, facilitating, maintaining, and/or enhancing the operation of the systems for facilitating the automatic transmission of an electronic receipt to a user completing a financial transaction at a computing device 100, as will be described in greater detail below. For example, the transaction processing system 105 can be configured to process financial transactions and the transaction service manager device 115 can act as an intermediary between the computing device 102 and the transaction processing system 105. For example, the transaction service manager device 115 can be operated by a merchant services and mobile payments company such as Square Inc. of San Francisco, Calif. However, it should be understood that such an intermediate device is not required to implement the systems and methods described herein.

The transaction service manager device 115 and remote transaction processing system 105 can include one or more server computing devices capable of embodying the systems and/or methods described herein. For example, the transaction processing system 105 can include an acquirer computing device 106 operated by an acquirer, which is typically the bank associated with the merchant or payment processors acting on behalf of the acquirer, as would be understood by those in the art; a payment device network computing device 107 operated by a payment device network, for example, MasterCard International Incorporated of Purchase N.Y.; and an issuing entity computing device 108 operated by an issuing financial institution, which is typically the bank associated with the user or account holder. Such computing devices directly/indirectly transmit and/or receive data to and from the computing device 102, for example via a communications network 120, thereby preferably initiating, facilitating, maintaining, and/or enhancing the operation of the systems for facilitating the automatic transmission of an electronic receipt to a user completing a financial transaction at a computing device 102, as will be described in greater detail below. Communication network 120 can include, for example and without limitation, a wired or wireless network, including a telecommunications network, local area network (LAN) or a wide area network (WAN), the Internet and the like.

In some implementations, the computing device 102 can be associated with an entity that the user is transacting with, such as a bank or a merchant. The computing device 102 can be used to collect information related to the financial transaction from the user and/or the third-party, communicate the information to the one or more remote computing devices (e.g., the transaction processing system 105 and/or the transaction service manager device 115) for processing and receive information from these remote computing devices. The computing device 102 can be operated by a representative of the entity (e.g., a clerk) who conducts the financial transaction with the user using the computing device 102. Alternatively, the computing device can be a stand-alone device, such as a self-checkout terminal or an ATM machine, configured to conduct transactions directly with the user.

Personal transaction device 101 can include transaction cards associated with user-accounts, for example, financial accounts such as debit cards, credit cards or prepaid cards. The user-accounts can be associated with an account holder or the user who is not necessarily the account holder. As would be understood by those skilled in the art, a debit card is a transaction card issued for a demand deposit account. A credit card is a transaction card issued for a credit card account. A prepaid card is a transaction card issued for a pre-funded account.

In addition or alternatively, personal transaction device 101 can be a "contactless" transaction device associated with one or more user-accounts. For example, the contactless-enabled devices can include a transaction card, a key-fob, or smart-phone. As would be understood by those skilled in the art, contactless transaction devices generally employ NFC technology, which facilitates secure, short range communication between electronic devices. More specifically, NFC is a short range high frequency wireless communication technology that enables the exchange of data between devices over a relatively short distance.

The personal transaction device 101 (e.g., debit cards, credit cards, prepaid cards and NFC enabled devices) can have an embedded computer readable memory (not shown) for securely storing user-account information therein. The user-account information can include financial information, such as a credit or debit account number, the account holder's name, a card verification code, loyalty program data, PINs and the like. Personal transaction device memory can be any suitable volatile or non-volatile computer readable storage medium, including, for example and without limitation, magnetic strips, onboard computer chips and more complex electronic systems such as NFC transponders, RFID transponders and the like. In addition, the memory can be read-only or rewriteable.

As would be understood by those skilled in the art, personal transaction devices having a magnetic stripe can typically store information in three "tracks." Tracks 1 and 2 are often used to store financial account information used to process financial transactions. In some implementations, the user's electronic contact addresses (e.g., an e-mail address, cellular telephone number, and the like) can be stored in a 'discretionary data' field of the commonly used tracks (track-1 and track-2). In addition or alternately, a user's electronic contact address can be stored in a discretionary data track, for example, track-3. By storing the electronic contact address in a discretionary data track, the electronic contact information is not constrained by formatting standards set for tracks 1 and 2. Accordingly, information stored on the discretionary track can be used by the issuer of the personal transaction device in a proprietary way, which can improve efficiency of financial transaction processing and the automatic transmission of receipts.

Personal transaction devices having onboard computer chips can use data elements to store information like a financial account number and additional parameters. Such chip devices can also have data elements that are 'reserved for future use.' Accordingly, the unused data elements can be used to store the user's contact information. In addition, NFC enabled transaction devices can follow either magnetic stripe transaction device or chip transaction device formats.

It should be noted that although much of the foregoing description has been directed to systems for processing transactions between a user and a merchant conducted at a mobile point of sale device, the particular arrangement of devices, particularly, the computing device 102, the transaction service manager device 115, and remote transaction processing system 105, as well as the transaction processing steps, are presented as a non-limiting, exemplary environment in which the systems and methods for facilitating the automatic transmission of an electronic receipt to a user conducting a financial transaction at a computing device described herein can be employed.

Figure 2:
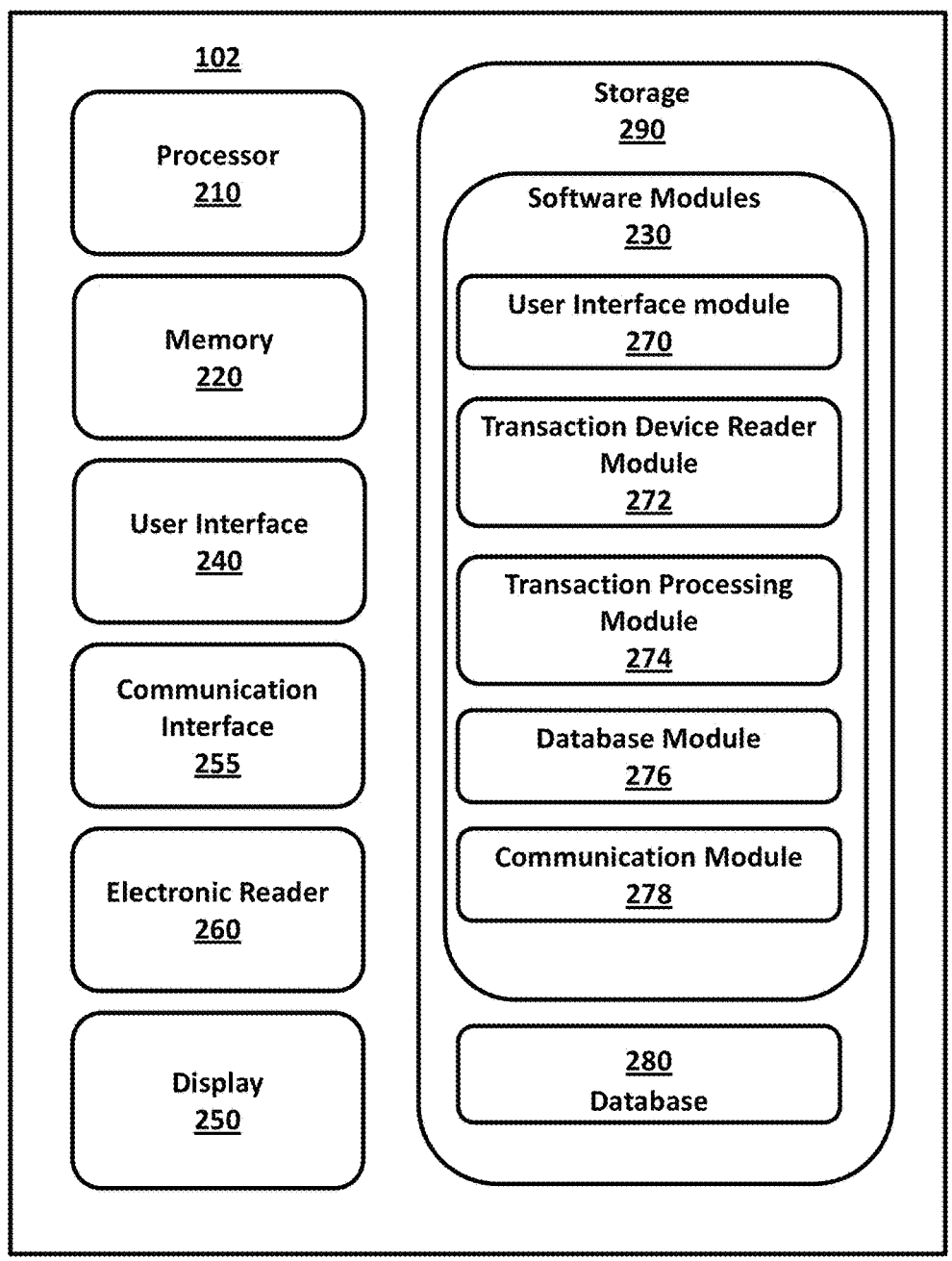
FIG. 2 is a block diagram illustrating an exemplary configuration of a computing device for facilitating the automatic transmission of an electronic receipt to a user conducting a financial transaction at a computing device in accordance with at least one embodiment disclosed herein.

FIG. 2 is a high-level diagram illustrating an exemplary configuration of the computing device 102 for use in the system (100) for facilitating the automatic transmission of an electronic receipt to a user conducting a financial transaction at a computing device.

Exemplary computing device 102 includes a processor 210, which is operatively connected to various hardware and software components that serve to enable operation of the systems and methods described herein. The processor 210 serves to execute instructions to perform various operations relating to conducting electronic transactions and for facilitating the automatic transmission of an electronic receipt as will be described in greater detail below. The processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable.

The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more software modules 230 are encoded in the storage 290 and/or in the memory 220. The software modules 230 can comprise one or more software programs or applications having computer program code or a set of instructions executed in the processor 210. Preferably, included among the software modules 230 is a user interface module 270, a transaction device reader module 272, a transaction processing module 274, a database module 276, and a communication module 278 that are executed by the processor 210. Such computer program code or instructions for carrying out operations or aspects of the systems and methods disclosed herein can be written in any combination of one or more programming languages, as would be understood by those skilled in the art.

The program code can execute entirely on the computing device 102 as a stand-alone software package, partly on the computing device 102 and partly on one or more remote computing devices, such as, a remote transaction processing system 105, a transaction service manager computing device 115, or entirely on such remote computing devices. In the latter scenario, the remote computing devices can be connected to the computing device 102 through any type of wired or wireless network, including a local area network (LAN) or a wide area network (WAN), or the connection can be made to an external computer (for example, through the Internet using an Internet Service Provider).

It should be understood that in some illustrative embodiments, one or more of the software modules 230 can be downloaded over a network to the storage 290 from another device or system via the communication interface 255 for use within the system (100) for facilitating the automatic transmission of an electronic receipt to a user conducting a financial transaction at a computing device. For instance, program code stored in a computer readable storage device in a server can be downloaded over a network from the server to the storage 290.

Also preferably stored on the storage 290 is a database 280. As will be described in greater detail below, database 280 contains and/or maintains various data items and elements that are utilized throughout the various operations of the system (100) for facilitating the automatic transmission of an electronic receipt to a user conducting a financial transaction at a computing device. It should be noted that although the database 280 is depicted as being configured locally to the computing device 102, in certain implementations the database 280 and/or various of the data elements stored therein can be stored on a computer readable memory or storage medium, which is located remotely and connected to the computing device 102 through a network (not shown), in a manner known to those of ordinary skill in the art.

A user interface 240 is also operatively connected to the processor 210. The interface can be one or more input device(s), such as switch(es), button(s), key(s), a touchscreen, as would be understood in the art of electronic computing devices. Interface serves to facilitate the capture of commands from the user and/or a third-party or information concerning the user and/or the third-party, or the particular financial transaction being conducted at the computing device 102. For example, the interface can capture information concerning the goods being sold from the third-party to the user, user information and third-party information and preferences related to the processing of the transaction and the transmission of an electronic receipt to the user, as further described herein.

A display 250 is also operatively connected to the processor. The display 250 includes a screen or any other such presentation device that enables the system to instruct or otherwise provide feedback to the user regarding the operation of the system (100) for facilitating electronic transactions and for facilitating the automatic transmission of an electronic receipt. By way of example, display 250 can be a digital display such as an LCD display, a CRT, or other such 2-dimensional display as would be understood by those skilled in the art.

By way of further example, the user interface 240 and the display 250 can be integrated into a touch screen display. Accordingly, the display is also used to show a graphical user interface, which can display various data and provide "forms" that include fields that allow for the entry of information by the user of the computing device 102. Touching the touch screen at locations corresponding to the display of a graphical user interface allows the user to interact with the device to enter data, control functions, etc. So when the touch screen is touched, interface communicates this change to processor, and settings can be changed or user entered information can be captured and stored in the memory.

One or more electronic readers 260 (e.g., external reader 103 in FIG. 1) can be operatively connected to the processor 210. The electronic reader 260 serves to facilitate the capture of electronic information from the user's personal transaction device. For example, in the context of an MPOS transaction, the computing device can be equipped with a magnetic stripe reader for capturing data from a personal transaction device having a magnetic stripe that is inserted into the reader 260 by the user. By way of further example, the electronic reader can also be a NFC-enabled reader that can read data from a NFC enabled personal transaction device that is presented to the reader 260 by the user. By way of further example, the electronic reader can be a computer chip reader that can obtain data from a personal transaction device having a computer chip.

A communication interface 255 is also operatively connected to the processor 210. The communication interface 255 can be any interface that enables communication between the computing device 102 and external devices, machines and/or elements. In certain implementations, the communication interface 255 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device 102 to other computing devices and/or communication networks, such as private networks and the Internet. Such connections can include a wired connection or a wireless connection (e.g., using the IEEE 802.11 standard known in the relevant art) though it should be understood that communication interface 255 can be practically any interface that enables communication to/from the processor 210.

At various points during the operation of the systems and methods disclosed herein, the computing device 102 can communicate, directly or indirectly, with one or more of the remote computing devices, such as the remote transaction processing system 105 and transaction services manager device 115 depicted in FIG. 1.

The operation of the exemplary system (100) for facilitating the automatic transmission of an electronic receipt to a user conducting a financial transaction at a computing device and the various elements and components described above will be further appreciated with reference to the method for facilitating the automatic transmission of an electronic receipt to a user conducting a financial transaction at a computing device described below, in conjunction with FIG. 3 and FIG. 4.

It should be appreciated that several of the logical operations described herein are implemented (1) as a sequence of computer implemented acts or program modules running on the various devices of the system 100 and/or (2) as interconnected machine logic circuits or circuit modules within the system (100) for facilitating the automatic transmission of an electronic receipt to a user conducting a financial transaction at a computing device. The actual implementation is a matter of design choice dependent on the requirements of the device (e.g., size, energy, consumption, performance, etc.). Accordingly, the logical operations described herein are referred to variously as operations, steps, structural devices, acts, or modules. As referenced above, the various operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Figure 3:
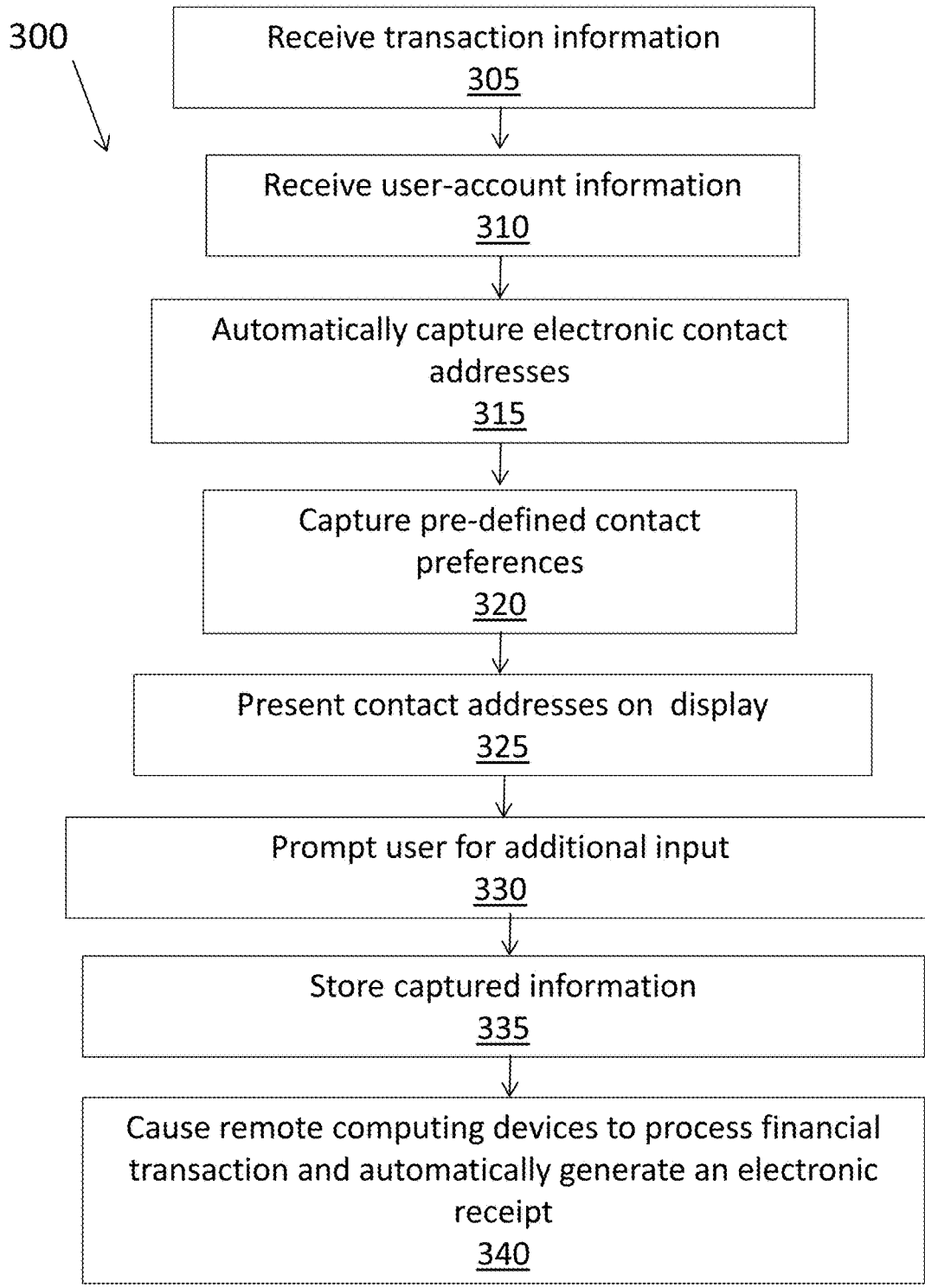
FIG. 3 is a flow diagram showing a routine for facilitating the automatic transmission of an electronic receipt to a user conducting a financial transaction at a computing device in accordance with at least one embodiment disclosed herein.

Turning now to FIG. 3, a flow diagram illustrates a routine 300 for facilitating the automatic transmission of an electronic receipt to a user conducting a financial transaction at a computing device in accordance with at least one embodiment disclosed herein. The process begins at step 305, where the processor 210, configured by executing one or more of software modules 230, including, preferably the user interface module 270 and the database module 276, receives transaction information concerning a financial transaction conducted by the user at the computing device 102.

In the context of a financial transaction for the purchase of goods by the user from a third-party, the transaction information can include a description of the goods being purchased, a price, information identifying the third-party, tax, and the like, as would be understood by those skilled in the art. For example, the third-party or the user can enter the transaction information manually using the user interface 240 or by scanning a product barcode, QR code and the like. In addition, transaction information can be previously received and stored in the database 280 and automatically retrieved by the processor 210 from the database 280 when the financial transaction process is initiated by the user or the third-party.

Then, at step 310, the processor 210, which is configured by executing one or more of the software modules 230, including, preferably, the transaction device reader module 272, receives user-account information from a personal transaction device 101 presented to the computing device 102 by the user. As mentioned above, the user-account information can include financial information associated with the user or an account holder such as, a credit or debit account number, the account holder's name, a card verification code, personal identification numbers, or other forms of user identifying information or financial account related information.

More particularly, the configured processor and the electronic reader 260 can read one or more fields of the transaction device's memory that are reserved for user-account information and store the captured information in the memory 220. For example, in order to transfer the information, the user can 'tap' an NFC-enabled personal transaction device 101 against an NFC-enabled electronic reader 260. By way of further example, the user can swipe a magnetic stripe enabled personal transaction device 101 on an electronic reader 260 that is configured to read magnetic stripe cards.

Then, at step 315, the processor 210, which is configured by executing one or more of the software modules 230, including, preferably, the transaction device reader module 272, can automatically capture one or more electronic contact addresses from the personal transaction device 101 presented by the user. The electronic contact addresses can include any type of electronic address that is uniquely associated with the user (or an account holder). By way of example and without limitation, an electronic contact address can include, a telephone number, an e-mail address, social network identifier (e.g., Facebook® account name, Twitter® handle, etc.), a networked electronic storage medium address (e.g., iCloud® account name, Dropbox® account name, etc.), and/or a unique account name or number associated with other networked software applications, for example, a user's personal accounting software.

In some implementations, the electronic reader 260 can read one or more of the memory fields that are reserved for storing non-user-account information and capture the information stored therein. In addition or alternatively, the electronic reader 260 can read one or more 'discretionary data' fields of the personal transaction device memory and capture one or more electronic contact addresses stored therein in a similar fashion to how the user-account information is captured at step 310.

In some implementations, the electronic reader 260 can read any or all of the memory fields of the personal transaction device 101, whether or not they are reserved for a particular type of information. In addition, the configured processor 210 can analyze the captured information to determine whether it includes one or more electronic contact addresses. For example, the processor 210 can analyze the information captured for indicators that the information captured corresponds to a particular type of electronic contact address, e.g., a phone number or an e-mail address, and store any identified electronic contact address on the storage 290 or the memory 220.

In addition to capturing the electronic contact addresses, at step 320, the configured processor 210 can also capture one or more pre-defined contact preferences that are stored in the storage 290 of the personal transaction device 101. The pre-defined contact preferences can include data or instructions concerning the particular manner in which the account holder or user prefers to receive electronic receipts. For example, the pre-defined contact preferences can specify that one or more of the stored electronic contact addresses are default contact address that the system should automatically transmit the receipt to. In addition or alternatively, the contact preferences can specify one or more priority levels associated with the one or more electronic contact addresses such that the electronic receipt can be transmitted to the contact addresses according to the associated priority levels. In some implementations, the contact preferences can specify instructions to not automatically transmit the receipt to any of the one or more electronic contact addresses. For example, the preferences can specify that the electronic receipt is to be automatically transmitted only after a user input is received instructing the electronic receipt to do so as further described herein.

Then at step 325, the processor 210, which is configured by executing one or more of the software modules 230, including, preferably, the user interface module 270, processes the captured electronic contact addresses and contact preferences and presents the information via the display 250. More particularly, in some implementations, the configured processor 210 can convert the received electronic contact address into a format that is suitable for display on the display 250. In addition, the configured processor can analyze any captured contact preferences and format the display of the electronic contact addresses according to the contact preferences. For example, the electronic contact addresses can be displayed according to respective priority levels as specified by the contact preferences.

Figure 5:
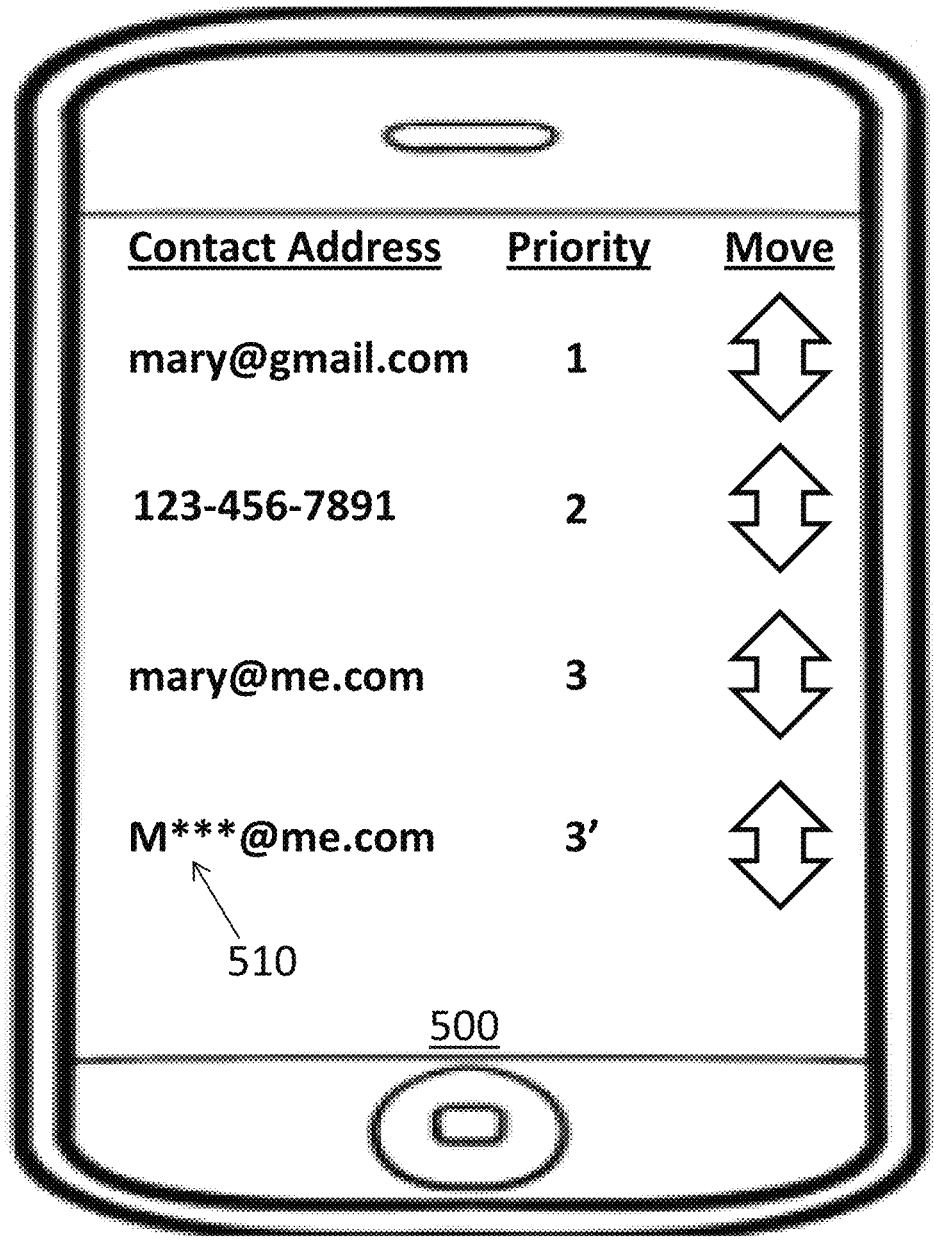
FIG. 5 depicts a screenshot of an exemplary user interface in accordance with at least one embodiment disclosed herein.

Formatting the captured electronic addresses can also include masking the contact addresses such that the entire contact address is not displayed. This is illustrated, by way of example, as the priority 3 address mary@me.com shown instead as m***@me.com 510 in the display 500 in FIG. 5. Masked display of the one or more contact addresses prevents the complete private contact information from being displayed on a device operated by untrusted personnel. Formatting can also include causing the contact addresses to be displayed in accordance with the contact preferences, for example, as a list ordered according to preference or otherwise specifying the associated preference as shown.

In addition to displaying the electronic contact addresses, at step 330, the processor 210, which is configured by executing one or more of the software modules 230, including, preferably, the user interface module 270 can prompt the user for additional input using the display 250. Accordingly, the user can input additional instructions, settings or preferences concerning the automatic transmission of an electronic receipt or processing of the transaction via the user interface 240 and the configured processor 210 can receive, process, display or record the user's input.

For example, the configured processor 210 can display one or more forms or virtual buttons on a touchscreen display prompting the user to input additional electronic contact addresses or make modifications to any of the captured electronic contact addresses. By way of further example, the configured processor 210 can prompt to the user to accept the pre-defined contact preferences or provide additional contact preferences or modify any pre-defined contact preferences. By way of further example, the user can deselect one or more addresses from the list of contact addresses. By way of further example, the user can input instructions indicating that the user opts not to receive an electronic receipt for the transaction.

In some implementations, the configured processor can prompt the user to select one or more financial-accounts specified in the user-account information with which to complete the financial transaction. For example, the user can be prompted to select the user's checking account or a credit card account to complete the financial transaction.

At step 335, the processor 210, which is configured by executing one or more of the software modules 230, including, preferably, the database module 276, stores the captured electronic contact addresses and any pre-defined contact preferences, user instructions and related information in the memory 220 and/or storage 290. It should be understood that the contact addresses can be stored in an encrypted format or in a secure data store. In addition or alternatively, the information can be temporarily stored for the purpose of processing the financial transaction and is erased or transmitted to a remote memory device for storing after completion.

Then, at step 340, the processor 210, which is configured by executing one or more of the software modules 230, including, preferably, the transaction processing module 274, causes one or more of the remote computing devices to process the financial transaction and automatically generate an electronic receipt and transmit the receipt to one or more of the user's contact address.

Figure 4:
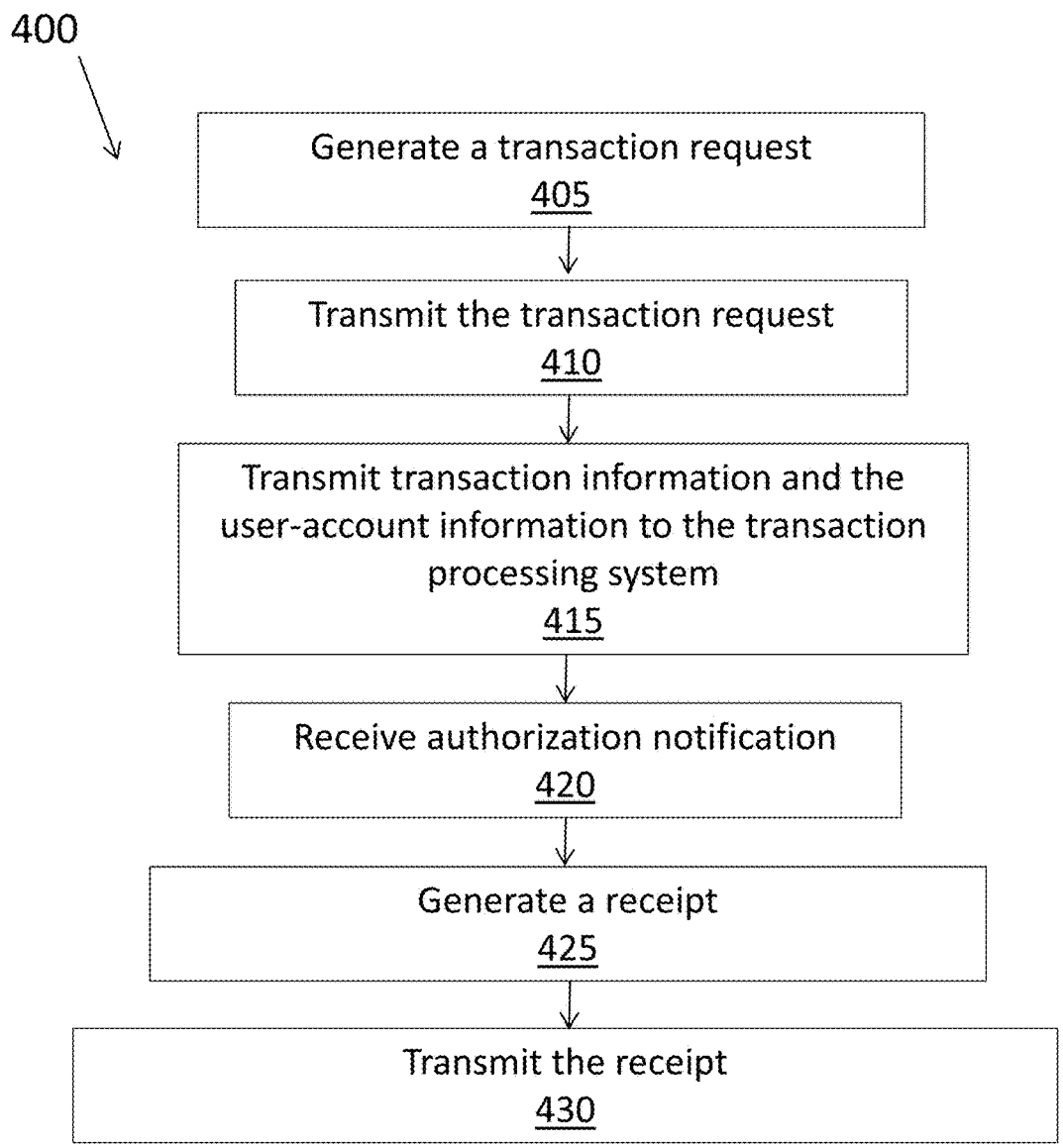
FIG. 4 is a flow diagram showing a routine for facilitating the automatic transmission of an electronic receipt to a user conducting a financial transaction at a computing device in accordance with at least one embodiment disclosed herein.

Step 340 is described in further detail in relation to the flow diagram of FIG. 4 which illustrates an exemplary sub-routine 400 in accordance with at least one embodiment disclosed herein. At step 405, the processor 210, which is configured by executing one or more of the software modules 230, including, preferably, the transaction processing module 274, generates a transaction request including at least a portion of the transaction information, the user-account information and one or more of the user's electronic contact addresses. Preferably, the transaction request includes the information necessary for the one or more remote computing devices (e.g., the transaction service manager device 115, and/or the transaction processing system 105) to process the financial transaction and to automatically transmit an electronic receipt.

In some implementations, the configured processor 210 can selectively include the electronic contact addresses in accordance with the pre-set contact preferences and/or any user instructions received at step 330. In addition or alternatively, the transaction request can include some or all of the pre-set contact preferences and/or any received user instructions enabling the one or more remote computing devices to further process the financial transaction and transmit an electronic receipt according to the contact preferences and user instructions. For example, the transaction request can include only those electronic contact addresses that the customer has selected to receive an electronic receipt and an associated priority level causing the one or more remote computing device to transmit the electronic receipt accordingly.

In addition, the configured processor can also format the transaction information, user-account information, electronic contact addresses, pre-defined contact preferences and other user instructions into a format that enables the one or more of the plurality of remote computing devices to process the financial transaction and automatically transmit the electronic receipt. However, it should be understood that formatting and processing of the transaction information, user-account information, electronic contact addresses, pre-defined contact preferences and other user instructions can be performed by the computing device 102, the transaction service manager device 115, or the transaction processing system 105 or a combination of the foregoing, as further described herein.

Then at step 410, the processor 210, which is configured by executing one or more of the software modules 230, including, preferably, the communications module 278, transmits the transaction request to the transaction service manager device 115. It should also be understood that the transaction request and the information included therein can be transmitted in any number of separate communications to one or more remote computing devices. For example, the user's contact addresses can be transmitted to a remote computing device configured to transmit receipts (e.g., the transaction service manager device 115), whereas the transaction information and user-account information can be transmitted to a remote computing device configured to process financial transactions (e.g., the transaction processing system 105).

Then at step 415, the transaction service manager device 115 can process the transaction request and transmit at least a portion of the transaction information and the user-account information to the transaction processing system 105. Accordingly, the transaction processing system 105 can process the financial transaction as would be understood by those skilled in the art. By way of example and without limitation, the transaction information and user-account information can be transmitted to an acquiring entity computing device 106. The acquiring entity computing device 106 can route the information, via the payment network computing device 107, to the issuing entity computing device 108 prompting the issuing entity to authorize the transaction. The issuing entity computing device 108 can then transmit an authorization notification indicating whether the transaction was authorized to the acquirer computing device 106. In turn, the acquirer computing device 106 can also pass the authorization notification back to the transaction service manager device 115, which is received by the transaction service manager device 115 at step 420.

Then at step 425, the transaction service manager device 115 generates a receipt according to the authorization notification and transmits the electronic receipt to one or more of the user's electronic address. More specifically, the transaction service manager device 115 can create a receipt according to the transaction information, the user-account information and the authorization notification indicating whether the transaction was authorized. For example, the receipt can include information concerning details about the purchase, the user's financial account used and whether the transaction was approved, as would be understood by those skilled in the art.

Then, at step 430, the transaction service manager device 115 can transmit the generated receipt to one or more electronic contact addresses according to the electronic contact addresses, the pre-defined contact preferences and/or the user instructions included in the transaction request. For example, the receipt can be automatically transmitted to a default electronic contact address as specified by the pre-defined contact preferences. By way of further example, the transaction service manager can first transmit the electronic receipt to an electronic contact address having the highest priority level, and in the event that the receipt is not successfully transmitted, the transaction service manager device can transmit the electronic receipt to the electronic contact address with the next highest priority and so on. It should be understood that these are non-limiting examples and it should be understood that the electronic receipt can be transmitted according to any number of different contact preferences and user instructions.

At this juncture, it should be noted that although much of the foregoing description has been directed to systems and methods for facilitating the transmission of electronic receipts concerning financial transactions, the systems and methods disclosed herein can be similarly deployed and/or implemented in scenarios, situations, and settings far beyond the referenced scenarios. It can be readily appreciated that system 100 can be effectively employed in practically any scenario where an electronic transaction is conducted between one or more parties, whether in person or via electronic methods, and it is desirable to transmit an electronic receipt memorializing the transaction to one or more of the parties. It can be also appreciated that the arrangement of computing devices and transaction processing steps can vary according to the particular type of transaction (e.g., bank transaction, credit card, debit card, pre-paid card, NFC payment, etc.), as would be understood by those skilled in the art.

It is to be understood that like numerals in the drawings represent like elements through the several figures, and that not all components and/or steps described and illustrated with reference to the figures are required for all embodiments or arrangements. Thus, illustrative embodiments and arrangements of the present systems and methods provide a computer implemented method, computer system, and computer program product for facilitating the automatic transmission of an electronic receipt to a user conducting a financial transaction at a computing device. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A system for facilitating a financial transaction conducted by a user using a merchant computing device, comprising:
    an electronic reader;
    a network communication interface;
    a computer-readable storage medium;
    one or more processors of the merchant computing device configured to interact with the electronic reader, the network communication interface and the computer-readable storage medium and execute one or more software modules stored on the storage medium including,
        a transaction device reader module that, when executed by the one or more processors, configures the one or more processors and the electronic reader to electronically read user-account information and automatically capture one or more electronic contact addresses associated with the user from a personal transaction device presented by the user, wherein the personal transaction device includes a memory having the user-account information and the one or more electronic contact addresses stored in one or more fields of the memory reserved for storing user account information, and wherein the one or more electronic contact addresses are automatically captured by, electronically reading the one or more fields of the memory reserved for storing user account information and determining whether the electronically read user account information includes one or more of the electronic contact addresses, wherein the determination includes analyzing the captured information for indicators that the information corresponds to one or more prescribed types of electronic contact addresses;
        a transaction processing module that, when executed by the one or more processors, configures the one or more processors to receive transaction information concerning the financial transaction; and
        a communication module that, when executed by the one or more processors, configures the one or more processors and the network communication interface, to transmit a transaction request including the transaction information and any electronic contact address corresponding to the one or more prescribed types to one or more of a plurality of remote computing devices, to cause one or more of the plurality of remote computing devices to process the financial transaction according to the transaction information and the user-account information, and to cause one or more of the plurality of remote computing devices to automatically transmit an electronic receipt concerning the processed financial transaction to the one or more electronic contact addresses over a communications network.

2. The system of claim 1, wherein the personal transaction device is physically presented by the user to the electronic reader for reading; and
    wherein the transaction device reader module configures the one or more processors to:
        read, using the electronic reader, the user-account information from one or more fields of the memory reserved for storing user-account information, and
        read, using the electronic reader, the one or more electronic contact addresses from one or more fields of the memory reserved for non-user-account information.

3. The system of claim 1, wherein the transaction device reader module further configures the one or more processors to automatically capture the one or more contact addresses by:
    reading information stored in one or more fields of the memory reserved for non-user-account information,
    analyzing the electronically read non-user-account information for indicators corresponding to one or more prescribed types of electronic contact addresses, and
    identifying the one or more electronic contact addresses from the information corresponding to the one or more prescribed types of electronic contact addresses.

4. The system of claim 1, wherein the transaction device reader module configures the one or more processors to read, from one or more fields of the memory reserved for storing non-user-account information using the electronic reader, contact preferences for the user concerning the automatic transmission of an electronic receipt to the one or more electronic contact addresses; and
    wherein the transaction request includes the contact preferences and causes the one or more of the plurality of remote computing devices to automatically transmit the electronic receipt in accordance with the contact preferences.

5. The system of claim 1, wherein the transaction processing module further configures the one or more processors to format the transaction information, the user-account information and the one or more electronic contact addresses into a format that enables the one or more of the plurality of remote computing devices to process the financial transaction and automatically transmit the electronic receipt.

6. The system of claim 1,
wherein the one or more processors are configured to transmit the transaction information and the user-account information to one or more of the plurality of remote computing devices that are configured to process financial transactions, and
wherein the one or more processors are configured to transmit the transaction information and the one or more electronic contact addresses to one or more of the plurality of remote computing devices that are configured to transmit electronic receipts and are separate from the one or more of the plurality of remote computing devices that are configured to process financial transactions.

7. The system of claim 1, further comprising:
a user interface module that, when executed by the one or more processors, configures the processor to:
present the one or more electronic contact addresses to the user through a display of the computing device in one or more of a masked format and an unmasked format;
receive, via an input device of the computing device, user instructions from the user concerning the automatic transmission of the electronic receipt to the one or more electronic contact addresses; and
wherein the transaction request is configured to cause the one or more of the plurality of remote computing devices to automatically transmit the electronic receipt to the one or more electronic contact addresses according to the user instructions.

8. The system of claim 4, wherein the contact preferences specify priority levels for the plurality of electronic contact addresses and the electronic receipt is transmitted to at least one of the plurality of contact addresses according to the priority levels.

9. The system of claim 4, wherein the contact preferences specify instructions to not automatically transmit the electronic receipt to at least one of a plurality of electronic contact addresses.

10. The system of claim 1, wherein the computing device is a mobile point of sale device.

11. The system of claim 1, wherein the plurality of electronic contact addresses can include an email address, social network identifier, a networked electronic storage device address, or a telephone number associated with the user.

12. The system of claim 1, wherein the personal transaction device is one or more of: a transaction card having a magnetic stripe, a transaction card having an embedded computer chip and a contactless transaction device.

13. A system for facilitating an automatic transmission of an electronic receipt to a user completing a financial transaction at a merchant computing device having an electronic reader in electronic communication therewith, comprising:
a network communication interface;
a computer-readable storage medium;
one or more processors of the merchant computing device configured to interact with the electronic reader, the network communication interface and the computer-readable storage medium and execute one or more software modules stored on the storage medium, including:
a transaction device reader module that, when executed by the one or more processors, configures the one or more processors using the electronic reader, to electronically read user-account information and automatically capture one or more electronic contact addresses associated with the user from a personal transaction device physically presented by the user to the electronic reader, wherein the personal transaction device includes a memory having the user-account information and the one or more electronic contact addresses stored in one or more fields of the memory reserved for storing user account information, and wherein the one or more electronic contact addresses are automatically captured by, electronically reading the one or more fields of the memory reserved for storing user account information and determining whether the electronically read user account information includes one or more of the electronic contact addresses, wherein the determination includes analyzing the captured information for indicators that the information corresponds to one or more prescribed types of electronic contact addresses;
a transaction processing module that, when executed by the one or more processors, configures the one or more processors to receive transaction information concerning the financial transaction; and
a communication module that, when executed by the one or more processors, configures the one or more processors and the network communication interface, to transmit a transaction request including the transaction information and any electronic contact address corresponding to the one or more prescribed types to one or more of a plurality of remote computing devices, to cause one or more of the plurality of remote computing devices to process the financial transaction according to the transaction information and the user-account information, and to cause one or more of the plurality of remote computing devices to automatically transmit an electronic receipt concerning the processed financial transaction to the one or more electronic contact addresses over a communications network.

14. The system of claim 13, wherein the transaction device reader module configures the one or more processors to:
read, using the electronic reader, the user-account information from one or more fields of the memory reserved for storing user-account information, and
read, using the electronic reader, the one or more electronic contact addresses from one or more fields of the memory reserved for non-user-account information.

15. The system of claim 13, wherein the transaction device reader module further configures the one or more processors to automatically capture the one or more contact addresses by:
reading information stored in one or more fields of the memory reserved for non-user-account information,
analyzing the electronically read non-user-account information for indicators corresponding to one or more prescribed types of electronic contact addresses, and identifying the one or more electronic contact addresses from the information corresponding to the one or more prescribed types of electronic contact addresses.

16. The system of claim 13, wherein the transaction device reader module configures the one or more processors to read, from one or more fields of the memory reserved for storing non-user-account information using the electronic reader, contact preferences for the user concerning the automatic transmission of an electronic receipt to the one or more electronic contact addresses; and
wherein the transaction request includes the contact preferences and causes the one or more of the plurality of remote computing devices to automatically transmit the electronic receipt in accordance with the contact preferences.

17. The system of claim 13,
wherein the one or more processors are configured to transmit the transaction information and the user-account information to one or more of the plurality of remote computing devices that are configured to process financial transactions, and
wherein the one or more processors are configured to transmit the transaction information and the one or more electronic contact addresses to one or more of the plurality of remote computing devices that are configured to transmit electronic receipts and are separate from the one or more of the plurality of remote computing devices that are configured to process financial transactions.

18. The system of claim 13, further comprising:
a user interface module that, when executed by the one or more processors, configures the processor to:
present the one or more electronic contact addresses to the user through a display of the computing device in one or more of a masked format and an unmasked format;
receive, via an input device of the computing device, user instructions from the user concerning the automatic transmission of the electronic receipt to the one or more electronic contact addresses; and
wherein the transaction request is configured to cause the one or more of the plurality of remote computing devices to automatically transmit the electronic receipt to the one or more electronic contact addresses according to the user instructions.

19. The system of claim 16, wherein the contact preferences specify priority levels for the plurality of electronic contact addresses and the electronic receipt is transmitted to at least one of the plurality of contact addresses according to the priority levels.

20. The system of claim 16, wherein the contact preferences specify instructions to not automatically transmit the electronic receipt to at least one of a plurality of electronic contact addresses.

* * * * *